United States Patent
Jakob

[11] 3,867,287
[45] Feb. 18, 1975

[54] PROCESS RM FOR PURIFYING INDUSTRIAL WASTE WATERS CONTAINING DIISOPROPYL AMINE

[75] Inventor: Harald Jakob, Frankfurt, Germany

[73] Assignee: Zimmer Aktiengesellschaft, Frankfurt am Main, Germany

[22] Filed: July 5, 1973

[21] Appl. No.: 376,471

[30] Foreign Application Priority Data
July 7, 1972 Germany.............................. 2233377

[52] U.S. Cl.......................... 210/59, 55/52, 210/60, 260/583 N, 261/125
[51] Int. Cl.............................................. C02b 1/10
[58] Field of Search............... 55/36, 37, 44, 46, 52, 55/53, 183, 185, 189, 196, 228; 210/59, 60, 63; 260/583 N; 261/125

[56] References Cited
UNITED STATES PATENTS

| | | | |
|---|---|---|---|
| 1,607,070 | 11/1926 | Gibson............................... | 55/46 X |
| 1,809,441 | 6/1931 | Elliott............................... | 55/189 X |
| 2,413,102 | 12/1946 | Ebert et al........................ | 55/52 X |
| 2,718,275 | 9/1955 | Banks............................... | 55/53 X |

Primary Examiner—Charles N. Hart
Assistant Examiner—Robert G. Mukai
Attorney, Agent, or Firm—Molinare, Allegretti, Newitt & Witcoff

[57] ABSTRACT

Diisopropyl amine contained in waste water can be removed by contacting the waste water in finely divided form with a air stream to produce a waste water stream containing a lesser amount of diisopropyl amine.

11 Claims, 1 Drawing Figure

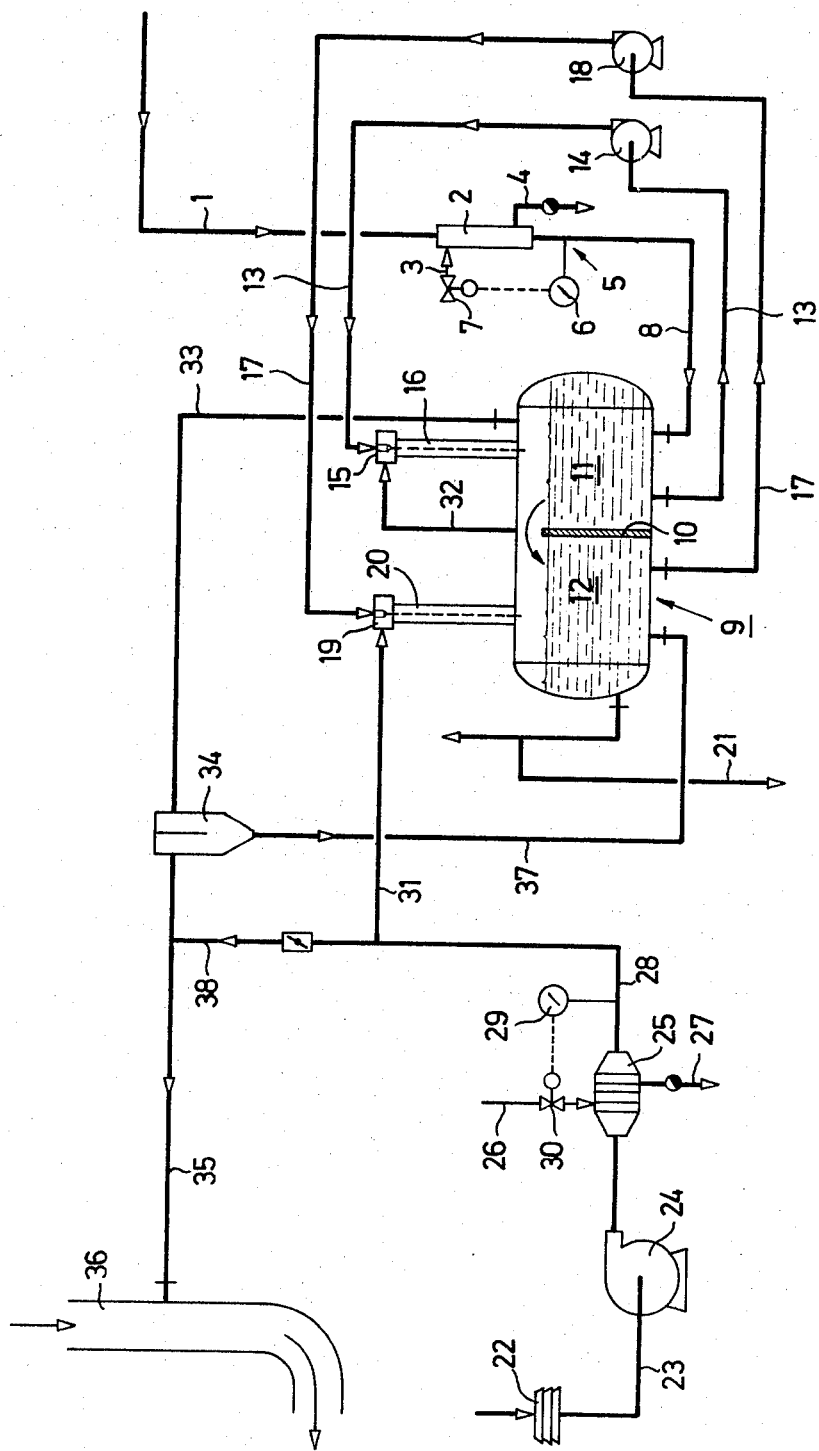

3,867,287

PROCESS RM FOR PURIFYING INDUSTRIAL WASTE WATERS CONTAINING DIISOPROPYL AMINE

BACKGROUND OF THE INVENTION

The present invention relates to a process for purifying industrial waste waters containing diisopropyl amine, particularly waste waters produced in the fractional distillation of glycol in polycondensation plants engaged in the production of polyesters.

In the fractional distillation of glycol from reaction products recovered from polycondensation plants, wherein terephthalic acid is esterified with ethylene glycol and the product is subsequently condensed, waste water containing diisopropyl amine is produced because diisopropyl amine is often utilized as an inhibitor of ether formation and/or catalyst deterioration. The waste water must be purified before it is discharged to the environment due to the highly poisonous properties of this substance.

SUMMARY OF INVENTION

An object of the present invention is to provide a process and apparatus by which a harmful component in waste water, diisopropyl amine, can effectively be reduced to a harmless fraction of its original amount with the least possible effort and to meet the legal standards of purity for waste waters. According to the present invention, this object is attained by providing waste water in finely divided form, contacting this finely divided waste water with continuously renewed air stream and subsequently separating the air stream from the liquid stream.

DETAILED DESCRIPTION OF THE INVENTION

It is a well-known fact that polluted gases containing vapors, gases, and dusts, can be purified by contacting the gases with finely divided liquid fogs. To this end, so-called liquid jet gas washers have been used which are designed like a liquid jet pump and consist of a suction chamber with a nozzle arranged therein through which the liquid is ejected as a jet of fine droplets under pressure and at great speed. The gases to be purified usually enter the suction chamber through the side of the jet and are brought into contact with the liquid droplets within the suction chamber. In this process, the liquid absorbs the admixtures of gases or vapors so that a purified gas is obtained after the liquid and gas have been separated.

Surprisingly, it has been discovered that a highly effective method to clean waste waters contaminated with diisopropyl amine may be achieved by reversing the effective principle of the liquid jet gas washers wherein the waste waters are subjected to a gas flow in a liquid jet gas washer. The gas to be used for effecting the cleaning or purification is preferably air, which, after having accomplished its task, is suitably directed to a combustion process, for example as the combustion air in an oil furnace.

The process of the invention is suitable for utilization both in a discontinuous and a continuous manner. In a further embodiment of the present invention, the cleaning or purification of the waste water may be enhanced by recirculating the waste waters and by exposing them to the effect of the gas flow several times. A continuous operation of the process may be achieved which offers special advantages wherein the waste waters are fed into a container divided into several chambers containing liquid jet gas washers, and several parallel waste-water cycles are maintained in the chambers and by conducting the flow of gas successively through the liquid jet gas washers arranged in the individual chambers. The waste waters may thereby be conducted continuously through the multi-chamber container in such a manner that they are present in each chamber for a mean period of direct contact. As a result of having the gas purification conducted separately for each chamber in the cycle, there is a gradual decrease of the concentration of diisopropyl amine in the sequence in which the chambers are arranged. Hence, the purity of the waste waters may be easily controlled by the selection of the number of chambers. The gas is suitably conducted through the individual gas washers, i.e., chambers, in a counterflow manner so that the gas flow gradually absorbs the vapors of diisopropyl amine.

The cleaning effect may be improved by heating the waste waters to a temperature of more than 30° C, preferably of more than 40° C, prior to their contact with the gas. For example, this may be accomplished by means of a steam-heated heat exchanger. Favorable cleaning effects particularly for a discontinuous method of operation are attained if the ratio of gas volume flow per time unit (in $Nm^3/h$) to weight of waste water (in kg) lies between 1 and 5, preferably between 1.7 and 4. Due to the fact that the correlation between volume of gas flow per unit time (in $Nm^3/h$) and volume of waste water circulated per unit time (in $m^3/h$) has some influence on the cleaning effect it is suggested that this ratio is selected so as to lie between 20 and 120, preferably between 40 and 90. As used herein "$Nm^3$" refers to the amount of gas contained in one cubic meter at 0°C. and one atmosphere of pressure, i.e., standard temperature and pressure.

In another embodiment, this invention relates to a specific apparatus for use in the process previously described. This apparatus is characterized as a container for the waste water, at least one liquid jet gas washer allotted to said container, at least one waste water circulation pump positioned between the container and gas washer, and means for supplying the gas washer with a flow of gas.

The container and liquid jet gas washer are suitably arranged by positioning the gas washer on the container with the liquid jet nozzle being aligned in vertical direction, with connection between the gas and waste water established by a tube in which the gas flow comes into intensive interaction with the liquid flow of subdivided small droplets. The container is preferably positioned below the jet and acts both as collector for the liquid and as separator for the gas flow. A device for supplying the gas washer with a flow of gas preferably consists of an air filter, a blower and an air pre-heater, all in series arrangement. The air pre-heater is suitably heated by heating steam.

To execute the process of the present invention in a continuous fashion, the device is preferably modified by providing a main container comprising several chambers connected in series, each container being equipped with one gas washer and one waste water circulation pump. In this embodiment, the waste water cycles are arranged parallel to each other and the gas supply lines of the gas washer are arranged in series. DESCRIPTION OF PREFERRED EMBODIMENT One example of an embodiment of an apparatus according to the present invention as well as the process realized therein is described in detail by reference to the attached FIGURE.

In the FIGURE, line 1 supplies the heat product waste water from a water column for the distillation of gycol. As a rule, this head product containes between 0.4 and 0.5 percent, by weight, diisopropyl amine. The waste water flows through a heat exchanger 2 in a continuous manner to heat the waste. Heating steam is supplied to heat exchanger 2 via line 3 and discharged therefrom via line 4. A temperature sensor 5 is located in the line, which in turn controls valve 7 through control circuit 6 thereby controlling the heat output of the heat exchanger in response to waste water temperature. The waste water is fed to a container 9 via line 8 which is subdivided into two separate chambers 11 and 12 by a separating wall 10. The separating wall 10 leaves one section of the cross-section open in the upper area of the container 9 so that the waste water initially entering into the chamber 11 may spill over the separating wall 10.

A circulation line 13 passes from chamber 11 via a waste water circulation pump 14 to a liquid jet gas washer 15, which is attached to container 9 by a tube 16 with its liquid jet nozzle, which is conventional and therefore not specified in more detail, being aligned in a vertical direction. The inside of container 9 and tube 16 communicate with each other so that a jet of droplets dropping down through the tube 16 are collected by a chamber 11 of container 9.

A similar arrangement is illustrated for chamber 12 by circulation line 17, circulation pump 18, a liquid jet gas washer 19 and a tube 20. The cleaned, purified waste water containing about 0.04 to 0.05 percent of diisopropyl amine is taken from container 9 via line 21. It can be seen that chambers 11 and 12 are arranged in series and that the waste water within the various chambers is circulated by parallel circulations 13 and 14, and 17 and 18.

The gas flow required for the cleaning process enters the apparatus as air via an induction filter 22 and flows into a gas line 23. A compressor 24 controls the transport of the gas stream first to a gas heater 25, which in turn is supplied with heating steam via line 26 which steam is discharged via line 27. A temperature sensor 28 together with a control instrument 29 and control valve 30 provide control for the heat output of the heat exchanger and the resultant temperature of the gas.

The gas flow is fed to the liquid jet gas washer 19 via line 31 and is intensely mixed with the liquid jet in the form of droplets in the gas washer 19. The gas and liquid together then flow into chamber 12 of container 9 via tube 20 and are then separated into separate gas and liquid phases in the chamber. The gas is then passed from container 9 via line 32 to the liquid jet gas washer 15, where the same purification process is repeated. The gas from washer 15, after separation in chamber 11, leaves container 9 via line 33 and is fed to discharge air line 35 after passing through a droplet separator 34. Air discharge line 35 ultimately discharges into an induction air line 36 of the oil furnace of a steam generating unit. It is clear that the flow of the gas through container 9 with regard to the concentration gradient of diisopropyl amine therein is in the opposite direction or counter current to the waste water. This is not changed by the fact that there are flows in the same direction within the individual stages, and/or within previous lines 20 and 16.

The waste water collected in the droplet separator 34 is passed back to container 9 via line 37. A connecting line 38 permits a control of the gas flow through the liquid jet gas washer or directly into the induction air line 36.

EXAMPLES

The specific apparatus shown in the FIGURE was operated in a discontinuous method of operation under various conditions in five experiments. In these tests, the container 9 was supplied with a predetermined amount of waste water and lines 1 and 21 were subsequently blocked. For a single step process, only one of the two chambers was filled with waste water while the other chamber remained empty. The various data of the tests which were carried out and the cleaning or purifiying results achieved are summarized in the table below. The respective diisopropyl amine content at the beginning, after 30, 60, 90 and 120 minutes are dependent on time. It can be seen that the residual content of diisopropyl amine in the purified waste water approaches an asymptotic limit value, lying approximately between 0.03 and 0.06 percent. The cleaning or purifying effect was surprisingly good in the entire range tested.

|  | Test No. | | | | |
| --- | --- | --- | --- | --- | --- |
|  | I | II | III | IV | V |
| PUMP pressure H₂O (atm. absolute excess pressure) | 4 | 4 | 2.5 | 4 | 2.5 |
| waste water volume (liter) | | | | | |
| (a) before | 90 | 190 | 50 | 100 | 50 |
| (b) after | 82 | — | 44 | 83 | — |
| loss (%) | 9 | — | 12 | 17 | — |
| number of stages | 1 | 2 | 1 | 2 | 1 |
| WASTE water temperature (°C) | 30 | 20 | 20 | 20–22 | 20 |
| air volume (Nm³/h) | 270 | 300 | 200 | 310 | 110 |
| air volume per liter of waste water (Nm³/kgh) | 3 | 1.7 | 4 | 3.1 | 3.2 |
| circulated volume of waste water (m³/h) | 3.5 | 2×3.5 | 2.7 | 2×3.5 | 2.7 |
| air volume: circulated volume in each stage (Nm³)/(m³) | 77 | 86 | 74 | 89 | 41 |
| initial content of diisopropyl amine (%) contents (%) | 0.32 | 0.63 | 0.27 | 0.52 | 0.38 |

| | Test No.—Continued | | | | |
|---|---|---|---|---|---|
| | I | II | III | IV | V |
| after 30 minutes | 0.08 | 0.23–0.3 | 0.07 | 0.09–0.11 | 0.07 |
| after 60 minutes | 0.03 | 1.2–1.7 | 0.05 | 0.06 | 0.05 |
| after 90 minutes | 0.03 | 0.07–0.09 | 0.04 | 0.05 | 0.04 |
| after 120 minutes | 0.03 | 0.05–0.06 | — | 0.05 | — |

I claim:

1. A process for purifying industrial waste water containing undesired amounts of diisopropyl amine by the removal of the amine from the waste water which comprises contacting the waste water, in a contacting zone, in finely divided form, with a continuously renewed stream of air, subsequently separating the resultant air and liquid mixture in a separation zone to produce a purified waste water containing a lesser amount of diisopropyl amine and an air stream containing the removed diisopropyl amine, and removing said purified waste water and air containing amine from said separation zone.

2. A process as in claim 1, wherein the waste water and air are contacted in a liquid jet gas washer.

3. A process as in claim 1 wherein the waste water is circulated in a cycle to expose waste water to the air stream several times.

4. A process as in claim 1, wherein the waste water is passed through a multi-chamber container, each chamber provided with liquid jet air washers, several parallel waste water cycles are maintained through each chamber and the air flow is successively guided through liquid jet air washers provided for each individual chamber.

5. A process as in claim 1 wherein the waste water prior to contact with the air stream is heated to a temperature of more than 30°C., said water temperature sufficient to maintain the water as a finely divided liquid in the contact step.

6. A process as in claim 5 wherein the waste water is heated to a temperature of more than 40°C.

7. A process as in claim 1 wherein the ratio of air flow per unit time ($Nm^3/h$) to weight of waste water (kg) is between 1 and 5, during a discontinuous operation.

8. A process as in claim 7 wherein said ratio is between 1.7 and 4.

9. A process as in claim 1 wherein the ratio of air flow volume per unit time ($Nm^3/h$) to waste water volume circulated per unit time ($m^3/h$) is selected to lie between 20 and 120.

10. A process as in claim 9 wherein said ratio is between 40 and 90.

11. A process as in claim 1 wherein the air flow is subjected to combustion after the cleaning process.

* * * * *